US009787863B2

(12) United States Patent
Nomura (10) Patent No.: US 9,787,863 B2
(45) Date of Patent: Oct. 10, 2017

(54) IMAGE FORMING APPARATUS AND IMAGE FORMING SYSTEM (71) Applicant: Oki Data Corporation, Tokyo (JP)

(72) Inventor: Jin Nomura, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 0 days.

(21) Appl. No.: 15/296,128

(22) Filed: Oct. 18, 2016

(65) Prior Publication Data
US 2017/0149985 A1 May 25, 2017

(30) Foreign Application Priority Data

Nov. 20, 2015 (JP) .................. 2015-228194

(51) Int. Cl.
*H04N 1/00* (2006.01)
*G06F 3/12* (2006.01)

(52) U.S. Cl.
CPC ......... *H04N 1/0023* (2013.01); *G06F 3/1204* (2013.01); *G06F 3/1222* (2013.01); *G06F 3/1238* (2013.01); *G06F 3/1267* (2013.01); *G06F 3/1288* (2013.01); *H04N 1/00204* (2013.01); *H04N 1/00344* (2013.01); *H04N 2201/0094* (2013.01)

(58) Field of Classification Search
USPC ......................................... 358/1.15
See application file for complete search history.

(56) References Cited

U.S. PATENT DOCUMENTS

| 2013/0100480 | A1* | 4/2013 | Ikeda ................. G06K 15/1822 358/1.14 |
| 2013/0222827 | A1 | 8/2013 | Watanabe |
| 2014/0146355 | A1* | 5/2014 | Kawara ................. G06F 3/1288 358/1.15 |
| 2014/0320913 | A1 | 10/2014 | Muroi |
| 2015/0092233 | A1* | 4/2015 | Park ..................... G06F 3/1288 358/1.15 |

FOREIGN PATENT DOCUMENTS

JP 2015-054413 A 3/2015

* cited by examiner

Primary Examiner — Ngon Nguyen
(74) Attorney, Agent, or Firm — Rabin & Berdo, P.C.

(57) ABSTRACT

An image forming apparatus includes a communication unit that communicates with an external device and acquires specific information added to a print job stored in the external device, a controller that specifies the print job among a plurality of print jobs stored in the external device based on the specific information acquired from the external device via the communication unit, and issues a transmission request for the specified print job to the external device, and an output unit that forms an image based on the print job acquired from the external device via the communication unit.

4 Claims, 6 Drawing Sheets

IMAGE FORMING APPARATUS AND IMAGE FORMING SYSTEM

BACKGROUND OF THE INVENTION

The present invention relates to an image forming apparatus that performs printing by receiving a print job from an external device, and also relates to an image forming system including the image forming apparatus.

A general image forming apparatus is configured to form an image by receiving data such as a print job from a cloud server (i.e., an external device). The cloud server stores the data uploaded by a host terminal via a network (see, Japanese Patent Application Publication No. 2015-54413).

Although the image forming apparatus can form an image by receiving data from the cloud server, there is a demand for enhanced user convenience.

SUMMARY OF THE INVENTION

An object of the present invention is to enhance user convenience.

According to an aspect of the present invention, there is provided an image forming apparatus including a communication unit that communicates with an external device and acquires specific information added to a print job stored in the external device, a controller that specifies the print job among a plurality of print jobs stored in the external device based on the specific information acquired from the external device via the communication unit and issues a transmission request for the specified print job to the external device, and an output unit that forms an image based on the print job acquired from the external device via the communication unit.

With such a configuration, user convenience is enhanced.

According to another aspect of the present invention, there is provided an image forming system including a user terminal that receives an input of a print job with specific information, an external device that receives the print job from the user terminal and includes a storage unit storing a plurality of print jobs, and an image forming apparatus including a communication unit that communicates with the external device and acquires the specific information added to the print job stored in the external device, a controller that specifies the print job among the plurality of print jobs stored in the external device based on the specific information acquired from the external device via the communication unit and issues a transmission request for the specified print job to the external device, and an output unit that forms an image based on the print job acquired from the external device via the communication unit.

DETAILED DESCRIPTION OF THE PREFERRED EMBODIMENT

First Embodiment

Hereinafter, an image forming apparatus and an image forming system according to the first embodiment of the present invention will be described with reference to the drawings.

Figure 1:
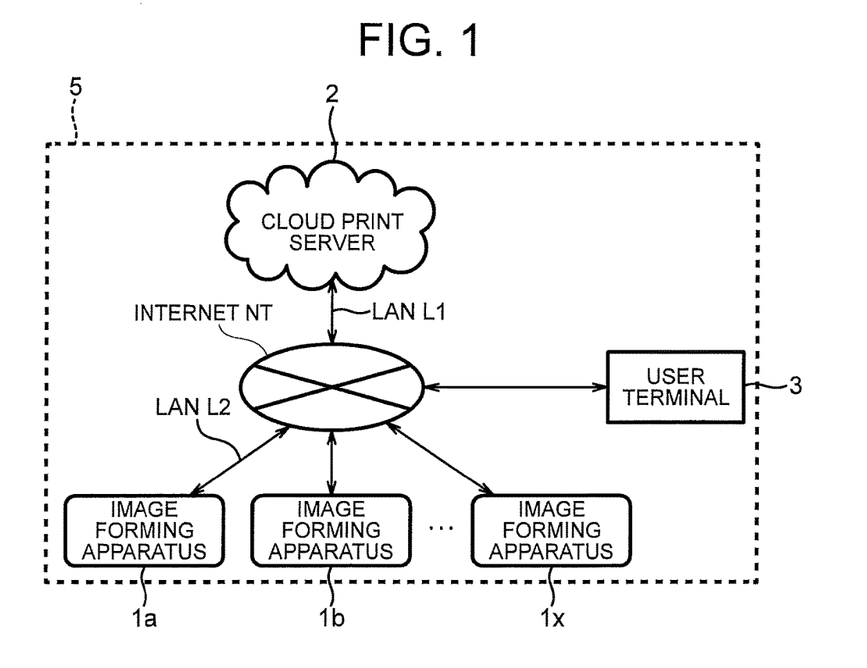
FIG. 1 is a block diagram showing a configuration of an image forming system according to the first embodiment.

FIG. 1 is a block diagram showing a configuration of an image forming system 5 of the first embodiment. In FIG. 1, the image forming system 5 includes image forming apparatuses 1 (1a, 1b . . . 1x), a cloud print server 2 (i.e., an external device or a cloud server) and a user terminal 3. The image forming apparatuses 1, the cloud print server 2 and the user terminal 3 are connected and communicate with each other via an internet NT (i.e., a communication network). Further, the cloud print server 2 is connected to the internet NT via a LAN (Local Area Network) L1. The image forming apparatuses 1 are connected to the internet NT via a LAN L2. In this regard, the image forming system 5 may include a single or a plurality of image forming apparatuses 1 connected to the internet NT.

The user terminal 3 of the image forming system 5 is constituted by a PC (Personal Computer), a portable information terminal, or the like. The user terminal 3 transmits print job data (hereinafter referred to as a print job) to the cloud print server 2 for registering the print job in the cloud print server 2. The print job specifies the image forming apparatus 1 registered in the cloud print server 2, and instructs the specified image forming apparatus 1 to perform printing.

The cloud print server 2 receives the print job from the user terminal 3, registers (adds) the print job in a storage unit, and transmits a notification to the image forming apparatus 1 of a registration (i.e., addition) of the print job.

When the image forming apparatus 1 receives the notification of the registration of the print job from the cloud print server 2, the image forming apparatus 1 receives (i.e., downloads) the print job from the cloud print server 2 and performs printing. In another case, when the image forming apparatus 1 becomes ready for printing, the image forming apparatus 1 receives (i.e., downloads) the print job from the cloud print server 2 and performs printing.

Figure 2:
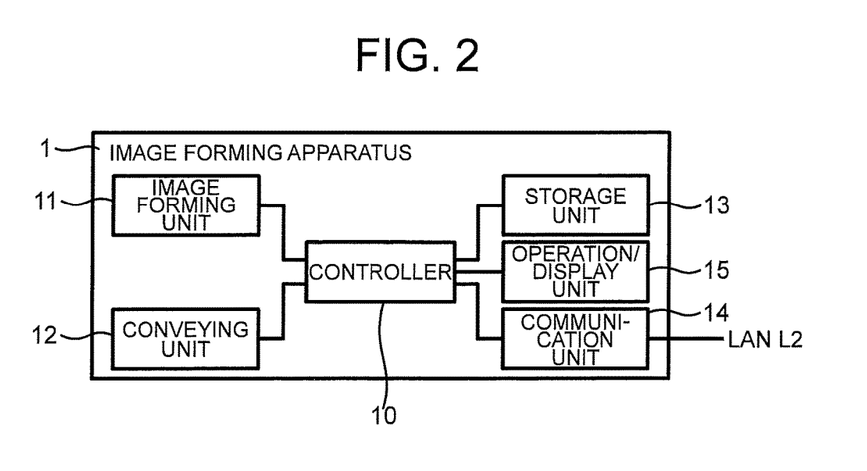
FIG. 2 is a block diagram showing a configuration of an image forming apparatus according to the first embodiment.

FIG. 2 is a block diagram showing a configuration of the image forming apparatus 1 of the first embodiment. In FIG. 2, the image forming apparatus 1 (i.e., each of the image forming apparatuses 1a, 1b . . . 1x shown in FIG. 1) is, for example, a printer, and includes a controller 10, an image forming unit 11, a conveying unit 12, and a storage unit 13 (or a storage device), a communication unit 14, and an operation display unit 15.

The controller 10 includes a control device such as a CPU (Central Processing Unit), and controls an entire operation of the image forming apparatus 1 based on a control program (software) stored in the storage unit 13.

The image forming unit 11 as an output unit (or an output device) is configured to form (i.e., output) an image on a print medium such as a paper based on print data included in the print job.

The conveying unit 12 conveys the print medium from a medium storage portion to the image forming unit 11. The conveying unit 12 also conveys the print medium on which the image is formed by the image forming unit 11, and ejects the print medium outside the image forming apparatus 1. The storage unit 13 includes a storage such as a memory. The storage unit 13 stores a print job, a control program, temporary information generated when controlling the operation of the image forming apparatus 1, and the like.

The communication unit 14 (i.e., a transmission/reception unit, or transmitter-receiver) is connected to the LAN L2, and communicates with the cloud print server 2 via the internet NT shown in FIG. 1 to transmit and receive various information. The communication unit 14 transmits a transmission request to the cloud print server 2 (FIG. 1) for the print job with specific information, and receives (acquires) the print job with the specific information in response to the transmission request.

In the first embodiment, the specific information corresponds to an authentication number. The authentication number is used in personal authentication when performing printing based on the print job.

The operation display unit 15 (i.e., an operation unit or an operation device) includes an input unit such as a key or a touch panel, and also includes an output unit such as a display. The operation display unit 15 informs a user (i.e., an operator) of various information, and receives an authentication number or the like input by the user.

The controller 10 of the image forming apparatus 1 acquires the specific information added to the print job from the cloud print server 2 (FIG. 1) as the external device via the communication unit 14. Based on the acquired specific information, the controller 10 specifies a print job (as an object of printing) among a plurality of print jobs stored in the cloud print server 2, and issues a transmission request to the cloud print server 2 for the specified print job. Based on the print job acquired from the cloud print server 2 via the communication unit 14, the image forming apparatus 1 performs printing (i.e., output).

Figure 3:
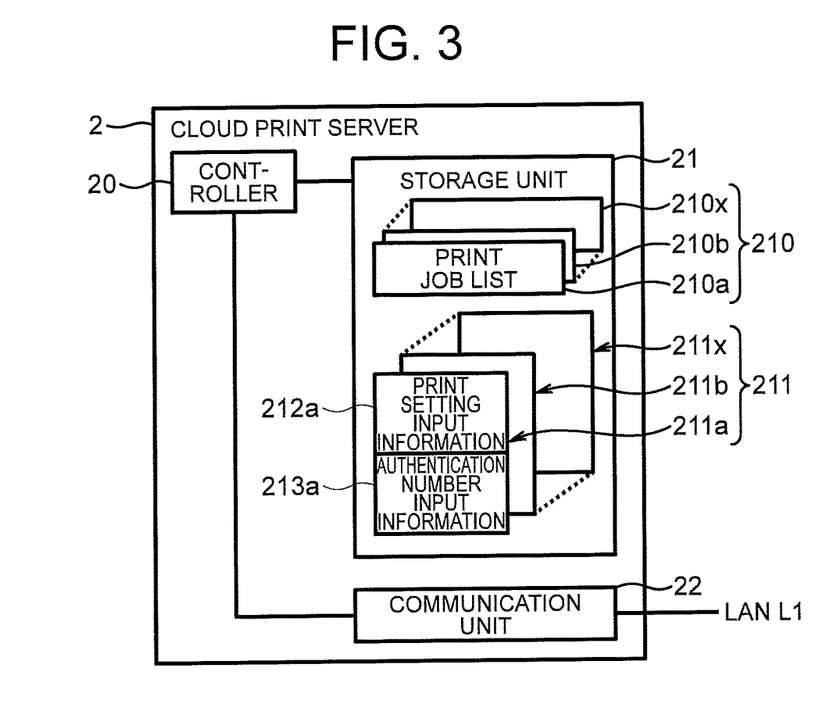
FIG. 3 is a block diagram showing a configuration of a cloud print server according to the first embodiment.

FIG. 3 is a block diagram showing a configuration of the cloud print server 2 of the first embodiment. In FIG. 3, the cloud print server 2 includes a controller 20, a storage unit 21 and a communication unit 22. The controller 20 includes a control device such as a CPU, and controls an entire operation of the cloud print server 2 based on a control program stored in the storage unit 21.

The storage unit 21 includes a storage such as a memory. The storage unit 21 stores print job lists 210, print job input control information 211, a control program, temporary information generated when controlling operation of the cloud print server 2, and the like.

The print job list 210 (i.e., each of print job lists 210a, 210b . . . 210x) stores registered print jobs. The print job lists 210a, 210b . . . 210x are respectively associated with the image forming apparatuses 1a, 1b . . . 1x of the image forming system 5 shown in FIG. 1. For example, the print job list 210a is associated with identification information of the image forming apparatus 1a shown in FIG. 1. Detailed description will be made later.

The print job input control information 211 (i.e., each of print job input control information 211a, 211b . . . 211x) defines information which is input when the print job is registered in the cloud print server 2. The print job input control information 211a, 211b . . . 211x are respectively associated with the image forming apparatuses 1a, 1b . . . 1x of the image forming system 5 shown in FIG. 1.

For example, the print job input control information 211a includes print setting input information 212a, and authentication number input information 213a. The print job input control information 211a is associated with the identification information of the image forming apparatus 1a shown in FIG. 1.

The print setting input information 212a includes information on designation of a name of a file to be printed (i.e., a print file), designation of a size (i.e., a paper size) of a paper on which printing is to be performed, designation of a print mode (i.e., a color printing or a monochrome printing), and the like.

The authentication number input information 213a includes information for inputting the authentication number.

The print job input control information 211 is preliminarily registered in the storage unit 21 of the cloud print server 2 by the user terminal 3 (FIG. 1) or the like. The user terminal 3 displays a print job setting screen (FIG. 5) on an operation display unit based on the print job input control information 211 corresponding to the image forming apparatus 1 designated by the user terminal 3.

The communication unit 22 is connected to the LAN L1, and communicates (transmits and receives) various information such as the print job with the image forming apparatus 1 and the user terminal 3 via the internet NT shown in FIG. 1.

The cloud print server 2 configured as above receives the print job from the user terminal 3 shown in FIG. 1, and registers (adds) the print job in the storage unit 21. Further, the cloud print server 2 transmits the print job registered in the storage unit 21 to the image forming apparatus 1 shown in FIG. 2.

Figure 4:
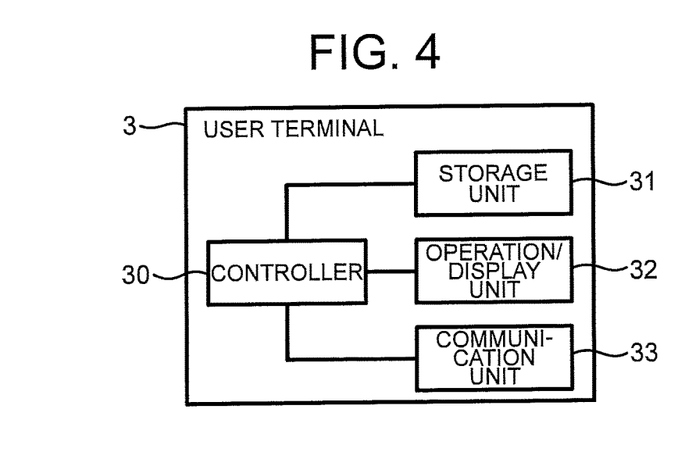
FIG. 4 is a block diagram showing a configuration of a user terminal according to the first embodiment.

FIG. 4 is a block diagram showing a configuration of the user terminal 3 of the first embodiment. In FIG. 4, the user terminal 3 includes a controller 30, a storage unit 31, an operation display unit 32, and a communication unit 33. The controller 30 includes a control device such as a CPU, and controls an entire operation of the user terminal 3 based on a control program stored in the storage unit 31.

The storage unit 31 includes a storage device such as a memory. The storage unit 31 stores a control program, temporary information generated when controlling an operation of the user terminal 3, and the like.

The operation display unit 32 includes an input unit (i.e., an operation unit) such as a key board, a touch panel or the like, and an output unit (i.e., a display unit) such as a display. The operation display unit 32 informs a user of various information, and receives an input by the user.

The communication unit 33 communicates various information such as a print job or the like with the cloud print server 2 via the internet NT shown in FIG. 1.

The user terminal 3 configured as above receives an input of the print job including the specific information, transmits the print job to the cloud print server 2 shown in FIG. 1 while designating the image forming apparatus 1 registered in the cloud print server 2, and registers the print job in the cloud print server 2.

Figure 5:
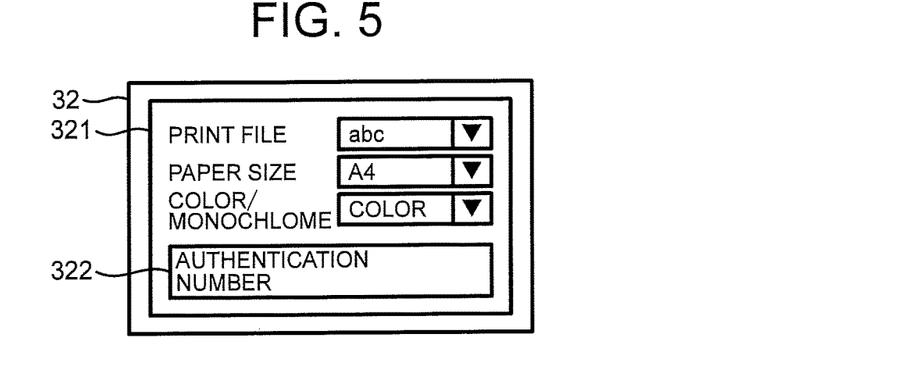
FIG. 5 is an explanatory diagram showing an operation display unit of the user terminal according to the first embodiment.

FIG. 5 is an explanatory diagram of the operation display unit 32 of the user terminal 3 of the first embodiment. More specifically, FIG. 5 illustrates a print designation and authentication number registration screen (i.e., a screen for setting print conditions and registering an authentication number) displayed on the operation display unit 32 (FIG. 4) of the user terminal 3.

In FIG. 5, a print job setting screen 321 (i.e., the print designation and authentication number registration screen) includes a setting part of a "print file" for designating a file to be printed, a setting part of a "paper size" for designating a size of a paper (i.e., a print medium) on which printing is performed, a setting part of a print mode ("color/monochrome") for designating a color printing or a monochrome printing, and an input form 322 for registering the authentication number. The input form 322 may be of any type. In the first embodiment, the input form 322 has a textbox that receives an input of text.

A user (i.e., an operator) operates the input unit of the user terminal 3 to input the print designation information on the print job setting screen 321 and register the authentication number in the input form 322. The print job setting screen 321 is displayed on the operation display unit 32 of the user terminal 3 according to the print job input control information 211 shown in FIG. 3.

Figure 6:
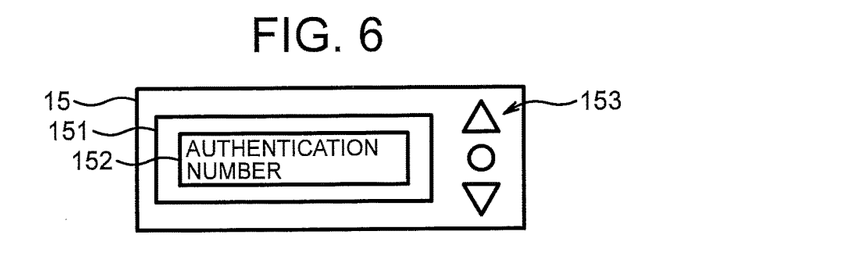
FIG. 6 is an explanatory diagram showing an operation display unit of an image forming apparatus according to the first embodiment.

FIG. 6 is an explanatory diagram of the operation display unit 15 of the image forming apparatus 1 of the first embodiment. More specifically, FIG. 6 illustrates an authentication number input screen displayed on the operation display unit 15 (FIG. 2) of the image forming apparatus 1. In FIG. 6, the authentication number input screen 151 displayed on the operation display unit 15 includes an input form 152 that receives an input of the authentication number. The input form 152 may be of any type. In this embodiment, the input form 152 has a textbox that receives an input of text. The user operates an input unit 153 to input the authentication number in the input form 152 of the authentication number input screen 151.

Figure 7:
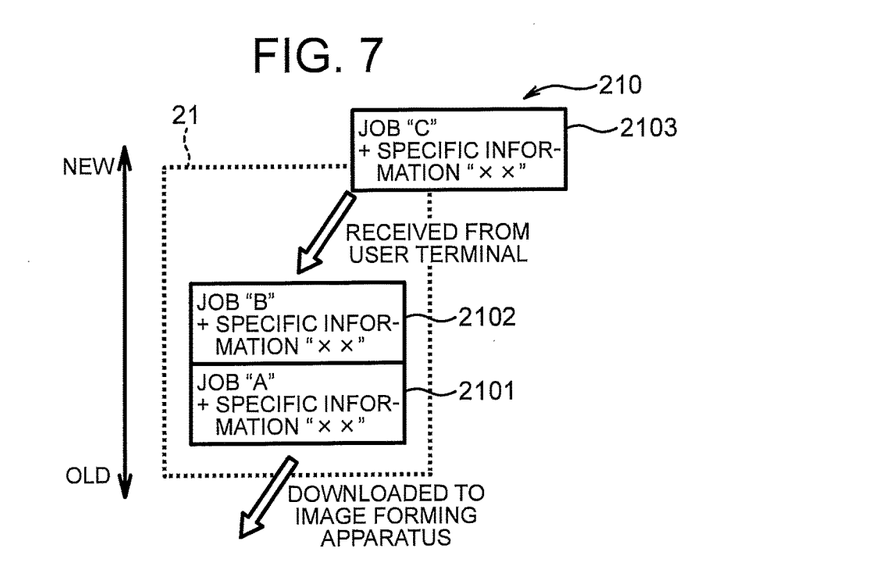
FIG. 7 is an explanatory diagram showing a print job list according to the first embodiment.

FIG. 7 is an explanatory diagram of the print job lists 210 of the first embodiment. More specifically, FIG. 7 illustrates the print job lists 210 (FIG. 3) stored in the storage unit 21 of the cloud print server 2. In FIG. 7, the print job lists 210 stored in the storage unit 21 respectively correspond to the image forming apparatuses 1 shown in FIG. 1. Each of the print job list 210 stores a queue of the print jobs (received from the user terminal 3) arranged in a sequential order.

When the cloud print server 2 (FIG. 1) receives a plurality of print jobs from the user terminal 3 sequentially, the cloud print server 2 stores the print jobs in the print job list 210 in order of reception. Further, when the cloud print server 2 downloads the print jobs to the image forming apparatus 1, the cloud print server 2 transmits the oldest print job as a first print job to the image forming apparatus 1. In this regard, the cloud print server 2 delates the print job having been transmitted to the image forming apparatus 1 from the print job list 210.

For example, when the cloud print server 2 (FIG. 1) receives a job "A" 2101, a job "B" 2102 and a job "C" 2103 (as the print jobs) in this order from the user terminal 3, the cloud print server 2 stores the job "A" 2101, the job "B" 2102, and the job "C" 2103 in the order of reception. That is, the cloud print server 2 stores the job "A" 2101 as the oldest print job, and stores the job "C" 2103 as the newest print job in the print job list 210.

In the first embodiment, when the cloud print server 2 downloads the print job to the image forming apparatus 1, the cloud print server 2 transmits (downloads) the job "A" 2101, the job "B" 2102 and the job "C" 2103 to the image forming apparatus 1 in order of reception. In this regard, specific information is added to each of the print jobs. According to information included in the specific information, the cloud print server 2 transmits (downloads) the print job to the image forming apparatus 1.

Here, the specific information is additional information for extending a function to perform printing based on the print job.

In the first embodiment, information (for example, "#1234") corresponding to an authentication number is added to each of the print jobs as the specific information. When the specific information added to the print job includes the information corresponding to the authentication number (for example, "1234") input by the user terminal 3, the image forming apparatus 1 (FIG. 1) prompts a user to input of the authentication number before performing printing. The image forming apparatus 1 collates the input authentication number and the authentication number corresponding to the specific information added to the print job, and performs printing based on the print job when both authentication numbers match each other. In this regard, the information (added to the print job) corresponding to the authentication number is obtained from the authentication number (for example, "1234") input on the print job setting screen 321 (FIG. 5) of the user terminal 3. An authentication number indicator (for example, "#") is added to the authentication number.

Further, when the specific information added to the print job includes no information corresponding to the authentication number input by the user terminal 3, the image forming apparatus 1 performs printing without prompting the user to input the authentication number and without performing collation of the authentication numbers.

Figure 8:
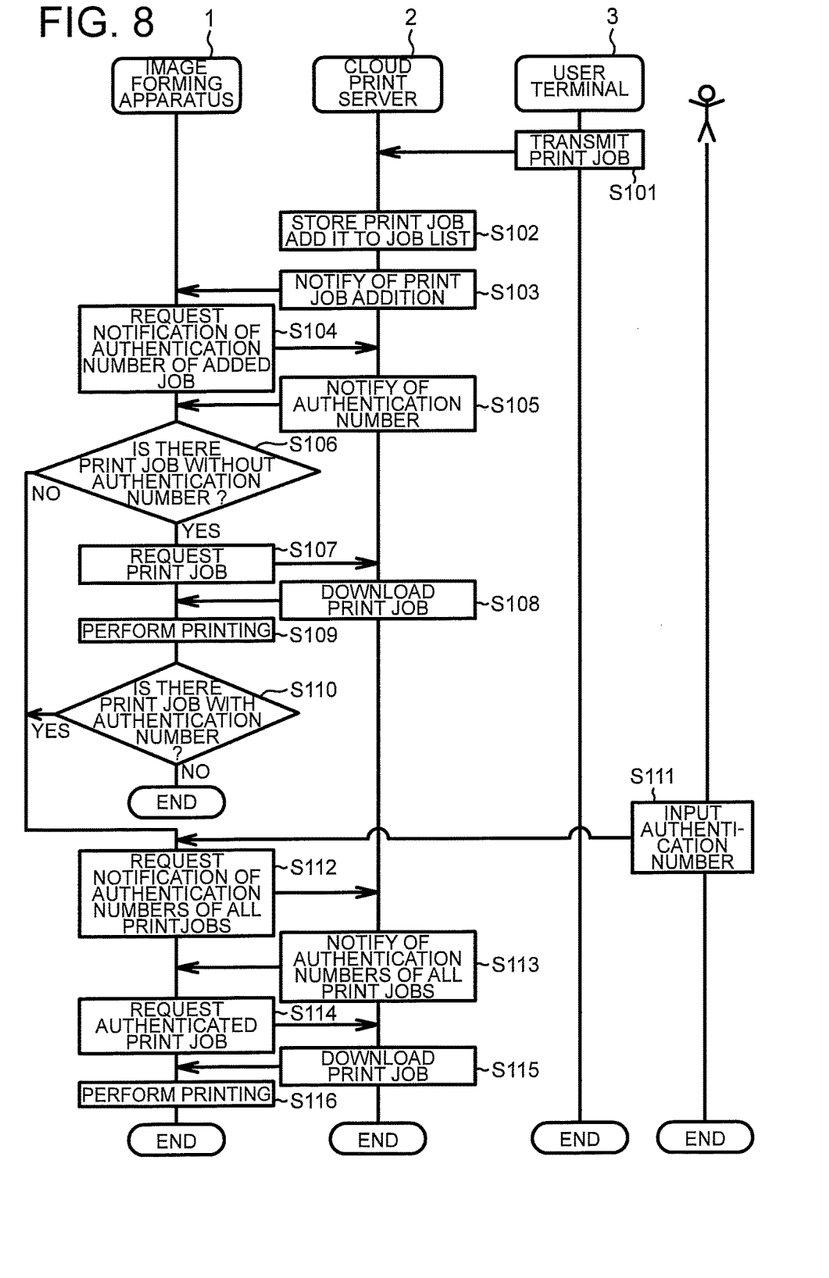
FIG. 8 is a flowchart showing print job processing according to the first embodiment.

Next, an operation of the above described configuration will be described. FIG. 8 is a flowchart showing print job processing performed by the image forming system 5 of the first embodiment. The print job processing will be described with reference to the flowchart shown in FIG. 8 and also with reference to FIGS. 1 through 7.

When a user selects the image forming apparatus 1 on the operation display unit 32, the user terminal 3 transmits identification information of the selected image forming apparatus 1 to the cloud print server 2. The user terminal 3 receives the print job input control information 211 corresponding to the selected image forming apparatus 1 from the cloud print server 2, and displays the print job setting screen 321 on the operation display unit 32.

In step S101, the user terminal 3 receives print settings such as a print file, a paper size and the like input by the user on the print job setting screen 321, and also receives the authentication number input by the user on the print job setting screen 321. When the user terminal 3 receives an input of a command to perform printing, the user terminal 3 transmits the print job added with the authentication number (i.e., the specific information) to the cloud print server 2.

In step S102, the cloud print server 2 stores the print job received from the user terminal 3 in the storage unit 21, and adds the print job to the print job list 210.

In step S103, the cloud print server 2 (having added the print job to the print job list 210) notifies the image forming apparatus 1 that the print job is added to the print job list 210.

In step S104, the image forming apparatus 1 transmits information to the cloud print server 2 to request the cloud print server 2 to notify the image forming apparatus 1 of a parameter list including the authentication numbers, in order to request notification of the authentication number of the added print job.

Here, the parameter list includes all authentication numbers extracted from the print jobs registered in the print job list 210 (associated with the concerned image forming apparatus 1) stored in the storage unit 21 of the cloud print server 2. In the parameter list, identification information (for example, identification numbers) of the print jobs and the extracted authentication numbers are associated with each other.

In step S105, the cloud print server 2 extracts all authentication numbers from the print jobs registered in the print job list 210, and notifies the image forming apparatus 1 of the extracted authentication numbers as the parameter list, in order to notify the image forming apparatus 1 of the requested authentication number.

In step S106, the image forming apparatus 1 determines whether there is a print job to which the authentication number is not set in the notified parameter list. If the image forming apparatus 1 determines that there is a print job to which the authentication number is not set, the image forming apparatus 1 proceeds step S107. If the image forming apparatus 1 determines that the authentication numbers are set to all print jobs, the image forming apparatus 1 proceeds step S111.

In step S107, the image forming apparatus 1 (having determined that there is a print job to which the authentication number is not set) transmits the identification number of the print job to which the authentication number is not set to the cloud print server 2 together with information requesting the cloud print server 2 to transmit the concerned print job to the image forming apparatus 1.

In step S108, when the cloud print server 2 receives the information requesting transmission of the print job, the cloud print server 2 transmits (downloads) the requested print job stored in the print job list 210 of the storage unit 21 to the image forming apparatus 1. If a plurality of print jobs are requested, the cloud print server 2 transmits the print jobs to the image forming apparatus 1 in order of time starting with the oldest print job.

In step S109, when the image forming apparatus 1 receives the print job, the image forming apparatus 1 performs printing based on the received print job.

In step S110, the image forming apparatus 1 (having completed printing) determines whether there is a print job to which the authentication number is set based on the parameter list notified in step S105. If the image forming apparatus 1 determines that there is a print job to which the authentication number is set, the image forming apparatus 1 proceeds to step S111. If the image forming apparatus 1 determines that there is no print job to which the authentication number is set, the image forming apparatus 1 ends the processing.

In step S111, the image forming apparatus 1 (having determined that there is a print job to which the authentication number is set) causes the operation display unit 15 to allow the user to input the authentication number on the authentication number input screen 151 shown in FIG. 6.

In step S112, when the image forming apparatus 1 receives the authentication number input on the authentication number input screen 151, the image forming apparatus 1 transmits information to the cloud print server 2 to request the cloud print server 2 to transmit authentication numbers of all print jobs registered in the print job list 210 to the image forming apparatus 1.

In step S113, when the cloud print server 2 receives the request to transmit the authentication numbers of all print jobs, the cloud print server 2 notifies the image forming apparatus 1 of the authentication numbers of all print jobs registered in the print job list 210 together with the identification information of the print jobs.

In step S114, the image forming apparatus 1 transmits the identification information of the print job whose authentication number matches the authentication number input in step S111 to the cloud print server 2 together with information (i.e., a transmission request) requesting the cloud print server 2 to transmit (download) the concerned print job to the image forming apparatus 1.

In this way, the controller 10 of the image forming apparatus 1 specifies the print job to be downloaded based on the input information (i.e., the input authentication number) input via the operation display unit 15 and the specific information (i.e., the authentication number of the print job) added to the print job received by the communication unit 14, and requests the cloud print server 2 to transmit the specified print job to the image forming apparatus 1.

In the first embodiment, the controller 10 of the image forming apparatus 1 collates the specific information added to the print job received by the communication unit 14 and the input information input via the operation display unit 15, specifies the print job whose specific information matches the input information, and issues the transmission request (i.e., download request) for the specified print job to the cloud print server 2.

In step S115, the cloud print server 2 transmits (downloads) the requested print job to the image forming apparatus 1.

In step S116, the image forming apparatus 1 performs printing based on the received print job, and ends the processing.

In this way, according to the first embodiment, the print job to which the authentication number (i.e., the specific information) is added by the user terminal 3 is transmitted to and registered in the cloud print server 2. The cloud print server 2 transmits the registered print job to the image forming apparatus 1. The image forming apparatus 1 receives the print job, and performs personal authentication based on the authentication number added to the print job, and then performs printing. Therefore, the user can perform printing using the image forming apparatus 1 based on the print job by inputting the authentication number for personal authentication at an arbitrary time after the user registers the print job in the cloud print server 2. Therefore, user convenience can be enhanced.

That is, the image forming apparatus 1 communicates with the cloud print server 2, and acquires the authentication number (i.e., the specific information) added to the print job stored in the cloud print server 2. Based on the acquired authentication number, the image forming apparatus 1 issues the transmission request to the cloud print server 2 for the print job (i.e., the object of printing) among the print jobs stored in the cloud print server 2. The image forming apparatus 1 acquires the print job, and performs printing based on the acquired print job. Therefore, printing can be performed based on the authentication number, and user convenience can be enhanced.

As described above, according to the first embodiment, the image forming apparatus 1 acquires the authentication number (i.e., the specific information) added to the print job. Based on the acquired authentication number, the image forming apparatus 1 issues the transmission request to the cloud print server 2 for the print job (i.e., the object of printing) among the print jobs stored in the cloud print server 2. Then, the image forming apparatus 1 performs printing based on the acquired print job. Therefore, user convenience can be enhanced.

Second Embodiment

A configuration of the second embodiment is different from the configuration of the first embodiment in that a print priority is added to the print job as the specific information.

Configurations of an image forming apparatus, an image forming system, a cloud print server and a user terminal of the second embodiment are the same as those of the above described first embodiment, and are therefore assigned with the same reference numerals. Duplicate explanations will be omitted.

Figure 9:
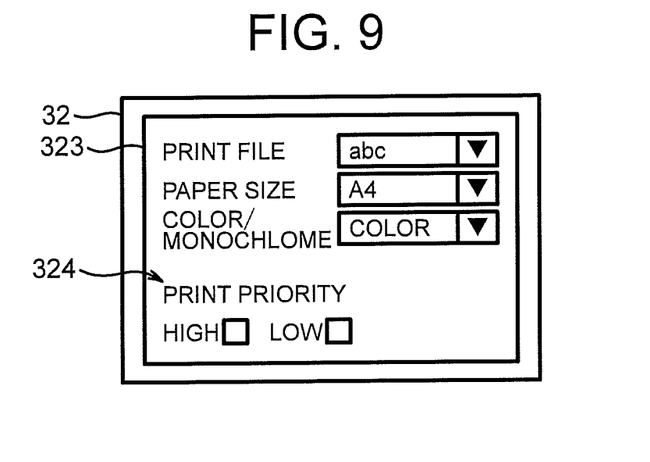
FIG. 9 is an explanatory diagram showing an operation display unit of a user terminal according to the second embodiment.

FIG. 9 is an explanatory diagram of an operation display unit of the user terminal 3 of the second embodiment. More specifically, FIG. 9 illustrates a print designation and print priority setting screen displayed on the operation display unit 32 of the user terminal 3 shown in FIG. 4.

In FIG. 9, a print job setting screen 323 as the print designation and print priority setting screen displayed on the operation display unit 32 includes a setting part of a "print file" for designating a file to be printed, a setting part of a "paper size" for designating a size of a paper on which printing is performed, a setting part of a printing mode ("color/monochrome") for designating a color printing or a monochrome printing, and an input form 324 for inputting a print priority (i.e., an order of print priority). The input form 324 may be of any type. In this embodiment, the input form 324 has two checkboxes for selecting between two levels of print priority, i.e., "high" and "normal". In this regard, the number of levels of priority is not limited to two, but may be three or more. For example, the input form 324 may be configured to allow selection among three levels such as "high", "normal" and "low", or allow selection among four or more levels such as "1" (i.e., the highest level), "2", "3", . . . "n" (i.e., the lowest level).

A user (i.e., an operator) operates the input unit of the user terminal 3 to input print designation information on the print job setting screen 323 and select the print priority in the input form 324. The print job setting screen 323 is displayed on the operation display unit 32 of the user terminal 3 according to the print job input control information 211 shown in FIG. 3.

In the second embodiment, information corresponding to the print priority is added to each print job as the specific information (FIG. 7). The information corresponding to the print priority is input on the print job setting screen 323 of the user terminal 3.

Figure 10:
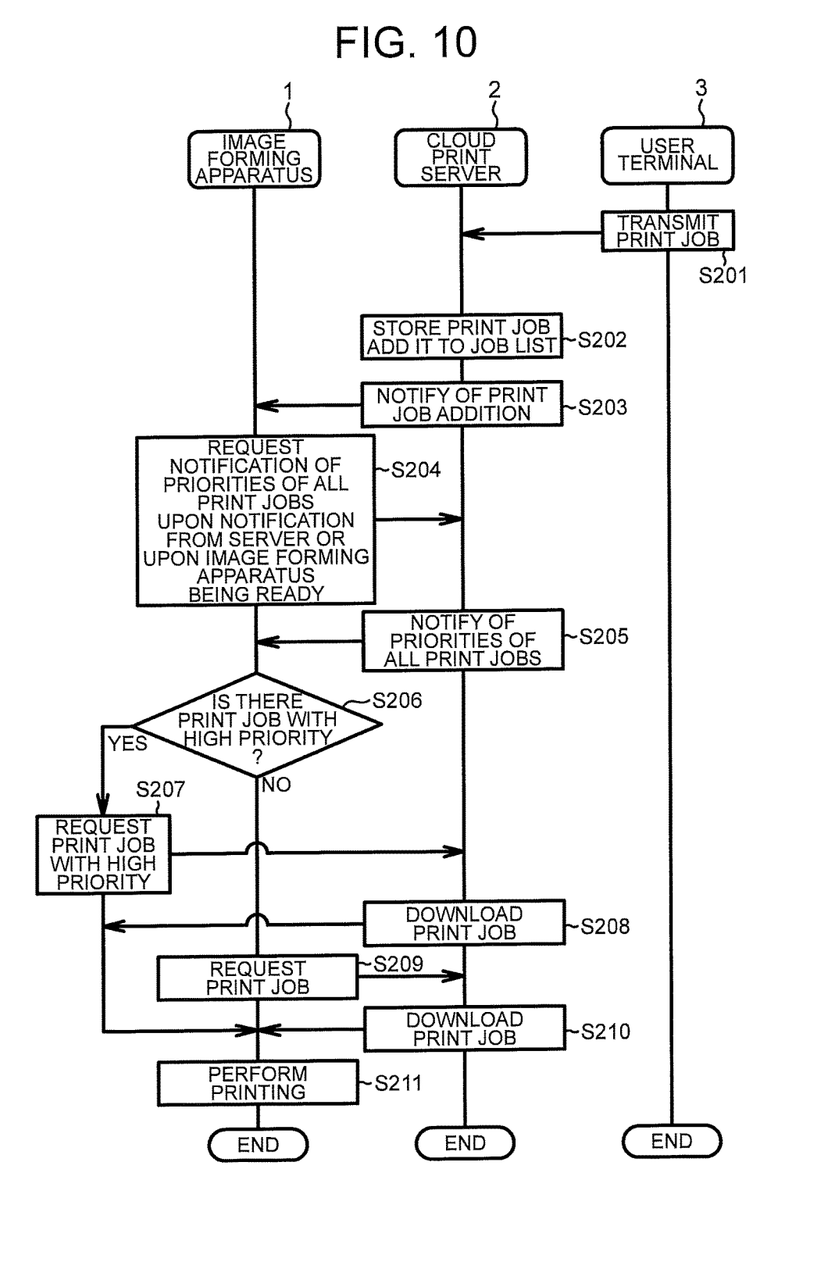
FIG. 10 is a flowchart showing print job processing according to the second embodiment.

Next, an operation of the above described configuration will be described. FIG. 10 is a flowchart showing print job processing performed by the image forming system of the second embodiment. The print job processing will be described with reference to the flowchart shown in FIG. 10 and also with reference to FIGS. 1 through 4, 7 and 9.

When the user selects the image forming apparatus 1 on the operation display unit 32, the user terminal 3 transmits identification information of the selected image forming apparatus 1 to the cloud print server 2. The user terminal 3 receives the print job input control information 211 corresponding to the selected image forming apparatus 1 from the cloud print server 2, and displays the print job setting screen 323 on the operation display unit 32.

In step S201, the user terminal 3 receives print settings such as a print file, a paper size and the like input by the user on the print job setting screen 323, and also receives the print priority input by the user on the print job setting screen 323. When the user terminal 3 receives an input of a command to perform printing, the user terminal 3 transmits the print job added with the print priority (i.e., the specific information) to the cloud print server 2. Hereinafter, the "print priority" will be simply referred to as a "priority".

In step S202, the cloud print server 2 stores the print job received from the user terminal 3 in the storage unit 21, and adds the print job to the print job list 210.

In step S203, the cloud print server 2 (having added the print job to the print job list 210) notifies the image forming apparatus 1 that the print job is added to the print job list 210.

In step S204, when the image forming apparatus 1 receives the notification of the addition of the print job or when the image forming apparatus 1 becomes ready to perform printing, the image forming apparatus 1 transmits information to the cloud print server 2 to request the cloud print server 2 to notify the image forming apparatus 1 of a parameter list including the priorities of all print jobs registered in the print job list 210 of the cloud print server 2.

Here, the parameter list includes all priorities extracted from the print jobs registered in the print job list 210 (associated with the concerned image forming apparatus 1) stored in the storage unit 21 of the cloud print server 2. In the parameter list, identification information (for example, identification numbers) of the print jobs and the extracted print priorities are associated with each other.

Further, the expression "when the image forming apparatus 1 becomes ready to perform printing" means when the image forming apparatus 1 becomes ready to perform printing based on a new print job, i.e., when the image forming apparatus 1 recovers from a state in which the image forming apparatus 1 is unable to perform printing based on a new print job. That is, the expression "when the image forming apparatus 1 becomes ready to perform printing" means, for example, when a power of the image forming apparatus 1 is turned on, when a printing paper is supplied to the image forming apparatus 1, or when printing based on a preceding print job is completed (for example, when printing takes long due to a decrease in printing speed or communication speed or the like).

There may be cases where a plurality of print jobs are registered in the print job list 210 of the cloud print server 2 while the image forming apparatus 1 is unable to perform printing based on a new print job. In order to perform printing based on the plurality of print jobs registered in the print job list 210, the image forming apparatus 1 transmits information to the cloud print server 2 to request the cloud print server 2 to transmit the parameter list including print priories of all print jobs registered in the print job list 210 to the image forming apparatus 1.

In step S205, the cloud print server 2 extracts all print priorities from the print jobs registered in the print job list 210, and notifies the image forming apparatus 1 of the extracted print jobs as the parameter list, in order to notify the image forming apparatus 1 of the priorities of the requested print jobs.

In step S206, the image forming apparatus 1 determines whether there is a print job with the "high" priority in the notified parameter list. If the image forming apparatus 1 determines that there is a print job with the "high" priority, the image forming apparatus 1 proceeds step S207. If the image forming apparatus 1 determines that there is no print job with the "high" priority, the image forming apparatus 1 proceeds step S209.

In step S207, the image forming apparatus 1 (having determined that there is a print job with the "high" priority) transmits the identification number of the print job with the "high" priority to the cloud print server 2 together with information (i.e., a transmission request) requesting the cloud print server 2 to transmit the concerned print job to the image forming apparatus 1.

In step S208, when the cloud print server 2 receives the information requesting transmission of the print job, the cloud print server 2 transmits (downloads) the requested print job with the "high" priority registered in the print job list 210 of the storage unit 21 to the image forming apparatus 1, and proceeds to step S211. If there are a plurality of print jobs with the "high" priorities in the print job list 210, the cloud print server 2 transmits (downloads) the print jobs with the "high" priority to the image forming apparatus 1 in order of time starting with the oldest print job.

Further, if the priority has three or more levels, the image forming apparatus 1 transmits the identification numbers of the print jobs to the cloud print server 2 in order of priority (starting the print job with the highest priority) together with information requesting the cloud print server 2 to transmit the print jobs to the image forming apparatus 1. The cloud print server 2 transmits (downloads) the print jobs to the image forming apparatus 1 in order of priority starting with the print job with the highest priority.

Further, if there are a print job to which the priority is set and a print job to which the priority is not set, the print job to which the priority is not set may be downloaded in the same order as the print job to which a medium order priority is set. For example, if the priority has three levels of "high", "normal" and "low", the print job to which the priority is not set may be downloaded in the same order as the print job with the "normal" priority. Further, if the priority has two levels of "high" and "low", the print job to which the priority is not set may be downloaded in the same order as the print job with the "low" priority.

Alternatively, a print job to which the priority is not set may be downloaded in the same order as the print job to which a low order priority is set. For example, if the priority has three levels of "high", "normal" and "low", the print job to which the priority is not set may be downloaded in the same order as the print job with the "low" priority. Further, if the priority has two levels of "high" and "low", the print job to which the priority is not set may be downloaded in the same order as the print job with the "low" priority.

In this way, the controller 10 of the image forming apparatus 1 specifies the print job to be downloaded based on the specific information (i.e., the priority of the print job) added to the print job received by the communication unit 14, and requests the cloud print server 2 to transmit the specified print job to the image forming apparatus 1.

In the second embodiment, the controller 10 of the image forming apparatus 1 specifies the print job (for which the transmission request or the download request is to be issued) among a plurality of print jobs in order of priority starting with the print job with the highest priority based on the specific information added to the print jobs.

In step S209, the image forming apparatus 1 (having determined that there is no print job with the "high" priority) transmits information to the cloud print server 2 to request the cloud print server 2 to transmit the print job to the image forming apparatus 1.

In step S210, when the cloud print server 2 receives the information requesting transmission of the print job, the cloud print server 2 transmits (downloads) the print job registered in the print job list 210 of the storage unit 21 to the image forming apparatus 1. If there are a plurality of requested print jobs, the cloud print server 2 transmits the print jobs to the image forming apparatus 1 in order of time starting with the oldest print job.

In step S211, when the image forming apparatus 1 receives the print job, the image forming apparatus 1 perform printing based on the received print job, and ends the processing.

In the second embodiment, the print job added with the print priority (as the specific information) is transmitted by the user terminal 3 to the cloud print server 2, and is registered in the cloud print server 2. The cloud print server 2 transmits the print priority of the print job registered in the cloud print server 2 to the image forming apparatus 1. Based on the print priority, the image forming apparatus 1 performs printing based on the print job transmitted from the cloud print server 2. With such a configuration, the user can print the print job with the higher priority earlier than previously registered print jobs. Therefore, user convenience can be enhanced.

That is, the image forming apparatus 1 communicates with the cloud print server 2, and acquires the print priority (as the specific information) added to the print job stored in the cloud print server 2. Based on the acquired print priority, the image forming apparatus 1 issues the transmission request to the cloud print server 2 for the print job (i.e., an object of printing) among the print jobs stored in the cloud print server 2. Based on the print job acquired from the cloud print server 2, the image forming apparatus 1 performs printing. Therefore, printing can be performed based on the priority, with the result that user convenience can be enhanced.

As described above, according to the second embodiment, the image forming apparatus 1 acquires the print priority (as the specific information) added to the print job, and issues the transmission request to the cloud print server 2 for the print job (i.e., the object of printing) among the print jobs stored in the cloud print server 2 based on the acquired print priority. The image forming apparatus 1 performs printing based on the print job acquired from the cloud print server 2. With such a configuration, user convenience can be enhanced.

In the above described first and second embodiments, the printer has been described as an example of the image forming apparatus. However, the present invention is also applicable to a facsimile machine, an MFP (Multi-Function Peripheral) or the like.

While the preferred embodiments of the present invention have been illustrated in detail, it should be apparent that modifications and improvements may be made to the invention without departing from the spirit and scope of the invention as described in the following claims.

What is claimed is:
1. An image forming apparatus comprising:
    a transmitter-receiver that communicates with an external device, and acquires
        first specific information regarding a priority, added to a first print job stored in the external device, and
        second specific information regarding the priority, added to a second print job stored in the external device;
    a controller that includes
        a processor, and
        a non-transitory storage medium containing program instructions, execution of which by the processor causes the controller to
            determine an order of issuing a first transmission request to acquire the first print job and issuing a second transmission request to acquire the second print job, based on the first and second specific information acquired from the external device via the transmitter-receiver, and issue the first and second transmission requests in the determined order; and an output device that forms an image based on the print jobs acquired from the external device via the transmitter-receiver.

2. The image forming apparatus according to claim 1, wherein the external device is a cloud server.

3. An image forming system comprising:

a user terminal that receives an input of a print job with specific information;

an external device that receives the print job from the user terminal and includes a storage unit storing a plurality of print jobs; and an image forming apparatus including a transmitter-receiver that communicates with an external device, and acquires first specific information regarding a priority, added to a first print job stored in the external device, and second specific information regarding the priority, added to a second print job stored in the external device;

a controller that includes a processor, and a non-transitory storage medium containing program instructions, execution of which by the processor causes the controller to determine an order of issuing a first transmission request to acquire the first print job and issuing a second transmission request to acquire the second print job, based on the first and second specific information acquired from the external device via the transmitter-receiver, and issue the first and second transmission requests in the determined order; and an output device that forms an image based on the print jobs acquired from the external device via the transmitter-receiver.

4. The image forming system according to claim 3, wherein the external device is a cloud server.

* * * * *